US009191077B2

(12) United States Patent
Ran et al.

(10) Patent No.: US 9,191,077 B2
(45) Date of Patent: Nov. 17, 2015

(54) TOUCH-SCREEN TERMINAL AND METHOD AND SYSTEM FOR NEAR-FIELD COMMUNICATION

(71) Applicant: SHENZHEN HUIDING TECHNOLOGY CO., LTD., Shenzhen, Guangdong (CN)

(72) Inventors: Rui Ran, Shenzhen (CN); Gengchun Deng, Shenzhen (CN)

(73) Assignee: SHENZHEN HUIDING TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/215,077

(22) Filed: Mar. 17, 2014

(65) Prior Publication Data

US 2014/0199944 A1 Jul. 17, 2014

Related U.S. Application Data

(63) Continuation of application No. PCT/CN2013/079490, filed on Jul. 16, 2013.

(30) Foreign Application Priority Data

Sep. 4, 2012 (CN) .......................... 2012 1 0337236

(51) Int. Cl.
*H04B 7/00* (2006.01)
*H04B 5/00* (2006.01)
*G06F 3/044* (2006.01)

(52) U.S. Cl.
CPC .............. *H04B 5/0087* (2013.01); *G06F 3/044* (2013.01); *H04B 5/0031* (2013.01)

(58) Field of Classification Search
CPC .. H04B 5/0012; H04B 5/0025; H04B 5/0031; G06F 3/041; G06F 3/044; G06F 3/0412
USPC ........................................ 455/41.1, 41.2, 41.3
See application file for complete search history.

(56) References Cited

U.S. PATENT DOCUMENTS

| 2004/0098455 | A1* | 5/2004 | Ellis et al. ..................... 709/204 |
| 2008/0127311 | A1* | 5/2008 | Yasaki et al. ..................... 726/4 |
| 2010/0081376 | A1* | 4/2010 | Emura ......................... 455/41.1 |
| 2010/0291921 | A1* | 11/2010 | Ruuska et al. ............. 455/426.1 |
| 2011/0070827 | A1* | 3/2011 | Griffin et al. ................ 455/41.1 |
| 2012/0162032 | A1* | 6/2012 | Yang et al. .................... 343/720 |
| 2012/0293430 | A1* | 11/2012 | Kitada ......................... 345/173 |
| 2013/0162594 | A1* | 6/2013 | Paulsen et al. ............... 345/174 |
| 2013/0169585 | A1* | 7/2013 | Choon ......................... 345/174 |
| 2013/0196596 | A1* | 8/2013 | Parekh et al. ................ 455/41.1 |
| 2013/0303084 | A1* | 11/2013 | Narendra et al. ............ 455/41.1 |
| 2014/0080411 | A1* | 3/2014 | Konanur et al. ............ 455/41.1 |
| 2014/0220892 | A1* | 8/2014 | Tsai ............................. 455/41.1 |

* cited by examiner

*Primary Examiner* — Duc M Nguyen

(57) ABSTRACT

A touch-screen terminal, method and system for near-field communication are provided. The touch-screen terminal includes a touch sensor, the touch sensor includes multiple driver electrodes and inductive electrodes disposed on a substrate to form capacitor structures. At least one of the driver electrodes and the inductive electrodes is used as a transmitting electrode; at least another one of the driver electrodes and the inductive electrodes is used as a receiving electrode. In the present invention, signal transmitting and receiving are achieved by multiplexing the electrodes of the touch-screen terminals, thereby enabling electric-field-based NFC. The system part for signal processing is embedded in the chip and, therefore, there is no need for an additional inductive card reader or part with the similar function. The present invention does not change the original size of the touch-screen terminal.

17 Claims, 6 Drawing Sheets

TOUCH-SCREEN TERMINAL AND METHOD AND SYSTEM FOR NEAR-FIELD COMMUNICATION

CROSS REFERENCE TO RELATED APPLICATIONS

The present application is a Continuation Application of PCT application No. PCT/CN2013/079490 filed on Jul. 16, 2013, which claims the benefit of Chinese Patent Application No. 201210337236.5 filed on Sep. 4, 2012; the contents of which are hereby incorporated by reference.

FIELD

The present invention relates to communication field and, more particularly, to a touch-screen terminal and method and system for near-field communication.

BACKGROUND

Near-field communication (NFC) is a contactless identification and interconnection technology which is based on the magnetic field near-field communication operating at 13.56 MHz to enable short-range wireless communication among mobile devices, consumer electronic products, PCs and smart objects, allowing users to conveniently and intuitively exchange data and access contents and services.

The market demand for NFC-integrated handheld devices such as mobile phones has become mature. The NFC-integrated mobile phones can be used for mobile payment or even used as a POS machine. NFC is based on the magnetic field communication and thus requires an inductive card reader or part with the similar function to be added to the handheld devices. However, the handheld devices such as the mobile phones undergoing such a modification usually have a bulky size. In addition, such modification imposes a limitation on the construction and part material of the handheld devices.

SUMMARY

In one embodiment, a method for transmitting information in a near-field communication by a first touch-screen terminal is provided which attempts to achieve near-field communication without increasing the original size of the touch-screen terminal. The first touch-screen terminal includes a touch sensor, the touch sensor includes multiple driver electrodes and inductive electrodes disposed on a substrate to form capacitor structures. At least one of the driver electrodes and the inductive electrodes is used as a transmitting electrode, and at least another one of the driver electrodes and the inductive electrodes is used as a receiving electrode. In this method, the first touch-screen terminal transmits near-field communication request information to a second touch-screen terminal through the transmitting electrode of the first touch-screen terminal. The first touch-screen terminal receives answer information from the second touch-screen terminal through the receiving electrode of the first touch-screen terminal, and establishes a communication connection with the second touch-screen terminal. The first touch-screen terminal transmits communication information to the second touch-screen terminal through the transmitting electrode of the first touch-screen terminal.

In another embodiment, a system for transmitting information in a near-field communication by a first touch-screen terminal is provided. The first touch-screen terminal includes a touch sensor, the touch sensor includes multiple transmitting electrodes and receiving electrodes disposed on a substrate to form capacitor structures, the transmitting electrodes and the receiving electrodes are configured to transmit and receive signals, respectively. The system includes: a near-field communication request information generating unit configured to generate near-field communication request information and transmitting the near-field communication request information to a second touch-screen terminal through the transmitting electrode of the first touch-screen terminal; a communication connection establishing unit configured to establish a communication connection with the second touch-screen terminal after the receiving electrode receives answer information from the second touch-screen terminal; and a first communication unit configured to transmit communication information to the second touch-screen terminal through the transmitting electrode of the first touch-screen terminal.

In another embodiment, a method for receiving information in a near-field communication by a second touch-screen terminal is provided. The second touch-screen terminal includes a touch sensor, the touch sensor includes multiple transmitting electrodes and receiving electrodes disposed on a substrate to form capacitor structures, the transmitting electrodes and the receiving electrodes are configured to transmit and receive signals, respectively. In this method, the second touch-screen terminal receives near-field communication request information from a first touch-screen terminal through the receiving electrode of the second touch-screen terminal and answering the request information. The second touch-screen terminal establishes a communication connection with the first touch-screen terminal after transmitting answer information to the first touch-screen terminal through the transmitting electrode of the second touch-screen terminal. The second touch-screen terminal receives communication information from the first touch-screen terminal through the receiving electrode of the second touch-screen terminal.

In another embodiment, a system for receiving information in a near-field communication by a second touch-screen terminal is provided. The second touch-screen terminal includes a touch sensor, the touch sensor includes multiple transmitting electrodes and receiving electrodes disposed on a substrate to form capacitor structures, the transmitting electrodes and the receiving electrodes are configured to transmit and receive signals, respectively. The system includes: a near-field communication request answering unit configured to answer a near-field communication request after the receiving electrode of the second touch-screen terminal receives near-field communication request information from a first touch-screen terminal, and transmit answer information to the first touch-screen terminal through the transmitting electrode of the second touch-screen terminal; a communication connection establishing unit configured to establish a communication connection with the first touch-screen terminal after the near-field communication request answering unit transmits the answer information to the first touch-screen terminal; and a second communication unit configured to receiving communication information from the first touch-screen terminal through the receiving electrode of the second touch-screen terminal.

In another embodiment, a method for near-field communication between a first touch-screen terminal and a second touch-screen terminal is provided. The first and second touch-screen terminals each include a touch sensor. The touch sensor includes multiple transmitting electrodes and receiving electrodes disposed on a substrate to form capacitor structures. The transmitting electrodes and the receiving electrodes are configured to transmit and receive signals, respectively. In this method, the first touch-screen terminal transmits near-field communication request information to the second touch-screen terminal through the transmitting electrode of the first touch-screen terminal. The second touch-screen terminal receives the near-field communication request information from the first touch-screen terminal through the receiving electrode of the second touch-screen terminal and answering the request information. The first touch-screen terminal establishes a communication connection with the second touch-screen terminal after the first touch-screen terminal receives answer information from the second touch-screen terminal through the receiving electrode of the first touch-screen terminal. The first touch-screen terminal and the second touch-screen terminal communicate therebetween.

In another embodiment, a system for near-field communication between a first touch-screen terminal and a second touch-screen terminal is provided. The system includes the first touch-screen terminal described above and the second touch-screen terminal described above.

In the present invention, signal transmitting and receiving are achieved by multiplexing the electrodes of the touch-screen terminals, thereby enabling electric-field-based NFC. The system part for signal processing is embedded in the chip and, therefore, there is no need for the additional inductive card reader or part with the similar function. Therefore, the present invention does not change the original size of the touch-screen terminal.

Other independent aspects of the invention will become apparent by consideration of the detailed description, claims and accompanying drawings.

DESCRIPTION OF THE EMBODIMENTS

Before any independent embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
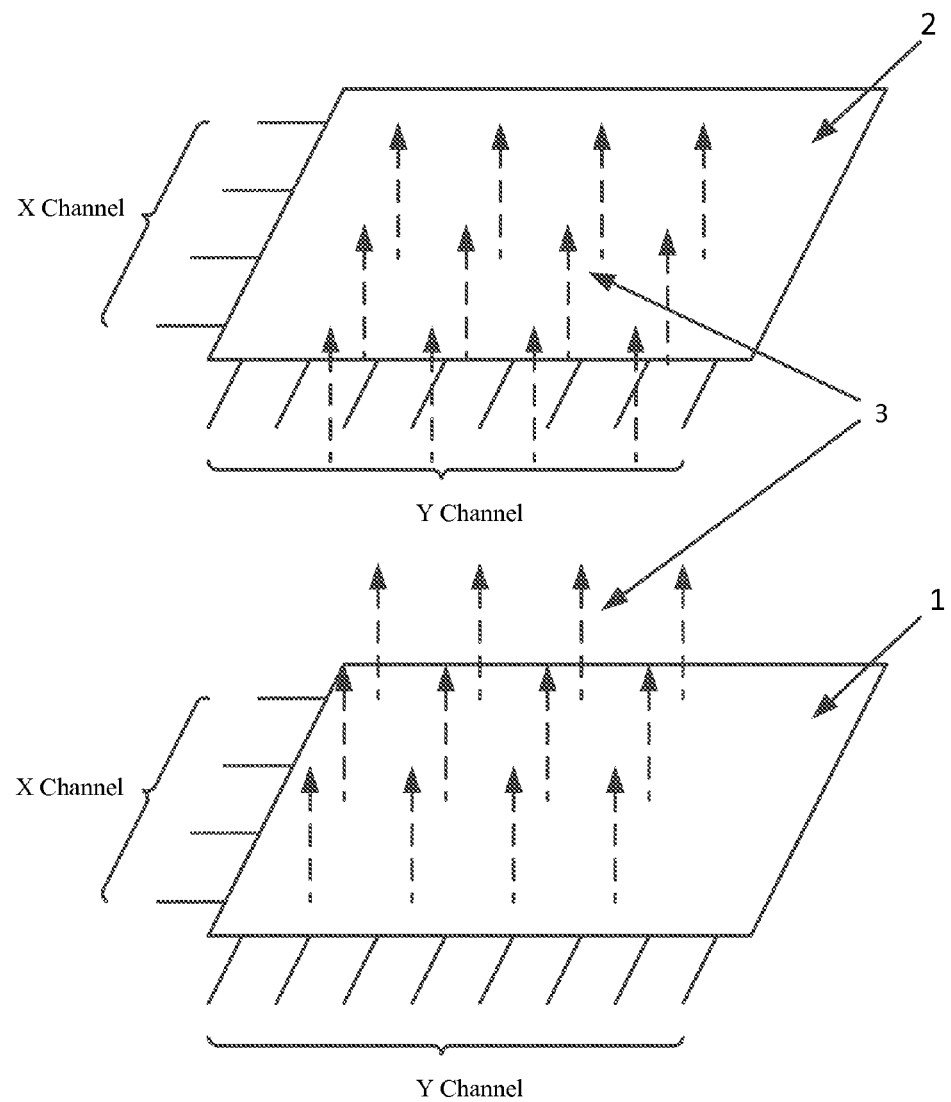
FIG. 1 is a view illustrating the principle of near-field communication between a first touch-screen terminal and a second touch-screen terminal according to one embodiment of the present invention.

The present invention multiplexes electrodes of the touch-screen terminal to transmit and receive signals, thereby achieving NFC communication using an electric field as the communication medium. Referring to FIG. 1, an electric field 3 is generated between a touch-screen terminal 1 and a touch-screen terminal 2 each having a transceiving function. When the touch-screen terminal 1 transmits information to the touch-screen terminal 2, the communication medium used is the part of the electric field part that has an electric field direction pointing to the touch-screen terminal 2. As shown in FIG. 1, when the touch-screen terminal 2 transmits information to the touch-screen terminal 1, the communication medium used is the part of the electric field that has an electric field direction pointing to the touch-screen terminal 1. "X channel" and "Y channel" of FIG. 1 refer to the transmitting electrode and receiving electrode disposed on a substrate to form capacitor structures, respectively.

Figure 2:
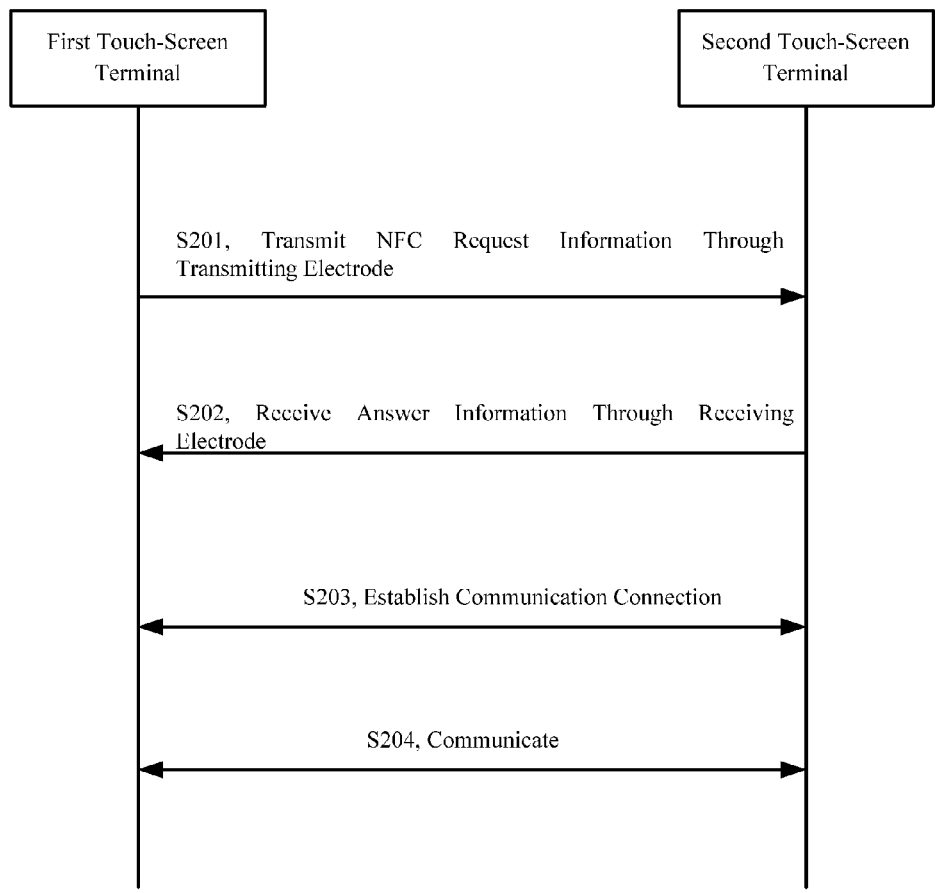
FIG. 2 is a flow chart illustrating the method of achieving NFC between a first touch-screen terminal and a second touch-screen terminal according to one embodiment of the present invention.

FIG. 2 is a flow chart illustrating the method of achieving NFC between a first touch-screen terminal and a second touch-screen terminal according to one embodiment of the present invention.

At step S201, the first touch-screen terminal transmits NFC request information to the second touch-screen terminal through the transmitting electrode of the first touch-screen terminal.

In the present invention, the first touch-screen terminal and the second touch-screen terminal each include a touch sensor. The touch sensor includes multiple transmitting electrodes and receiving electrodes disposed on the substrate to form capacitor structures. The transmitting electrodes and receiving electrodes transmit and receive signals, respectively.

Figure 3:
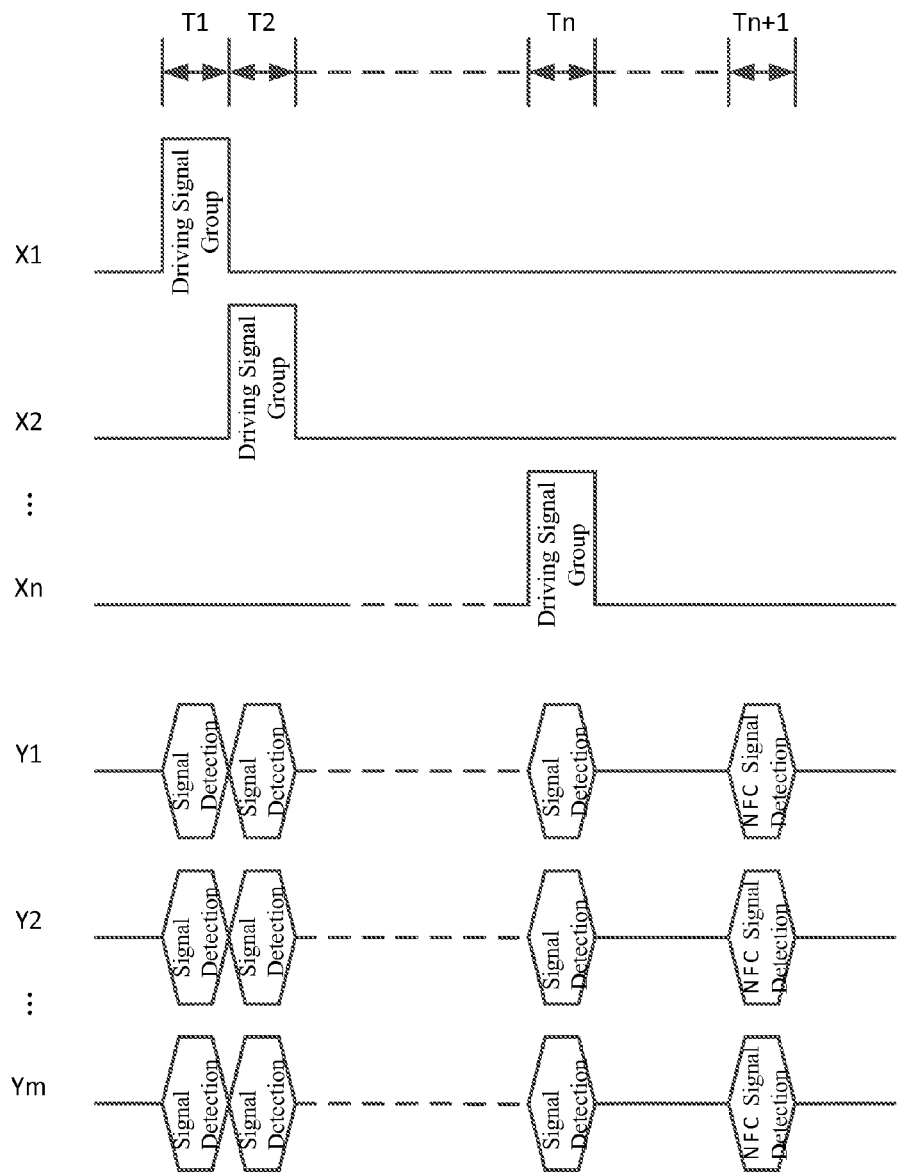
FIG. 3 illustrates a sequence in which the touch-screen terminal detects whether there is an NFC request according to one embodiment of the present invention.

FIG. 3 illustrates a sequence in which the touch-screen terminal detects whether there is an NFC request according to one embodiment of the present invention. The touch-screen terminal periodically transmits and scans signals during operation. It is assumed that there are n transmitting signal channels X and m receiving signal channels Y. During each scan, the transmitting signal channels X1 to Xn transmit signals at T1 to Tn time units, respectively, and the receiving signal channels Y1 to Ym perform both signal receiving and processing at each of the T1 to Tn time units. If the terminal supports NFC communication, then an additional time window Tn+1 is added to detect whether NFC communication needs to be established after each scan is completed.

When there are multiple touch-screen terminals, to avoid communication with an incorrect object, the above NFC request information carries ID information of the first touch-screen terminal.

At step S202, the second touch-screen terminal receives the NFC request information from the first touch-screen terminal through the receiving electrode of the second touch-screen terminal and answers the request.

Correspondingly, the answer information carries ID information of the second touch-screen terminal.

At step S203, a communication connection is established between the first touch-screen terminal and the second touch-screen terminal after the first touch-screen terminal receives the answer information from the second touch-screen terminal through the receiving electrode of the first touch-screen terminal.

At step S204, the first touch-screen terminal and the second touch-screen terminal communicate therebetween.

Figure 5:
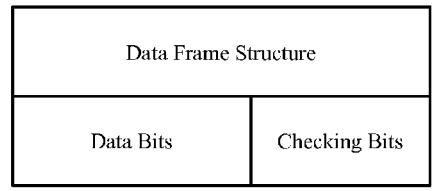
FIG. 5 illustrates a data frame structure according one embodiment of the present invention.

Further, referring to FIG. 5, to ensure correct delivery of the communication information, data frames of the communication information of the present invention contain data bits and checking bits. After the second touch-screen terminal receives one or more frames of the communication information, the second touch-screen terminal performs checking calculation to the data bits and compares result of the checking calculation against the checking bits to determine consistency thereof. If they are inconsistent, the second touch-screen terminal transmits a re-transmit request to the first touch-screen terminal through the transmitting electrode of the second touch-screen terminal.

If NFC operates at a full-duplex mode, signal transmitting and receiving between the involving terminals can occur at the same time. If NFC operates at a half-duplex mode, the signal transmitting and receiving must occur alternatingly. In this case, channel control right is involved. The second touch-screen terminal transmits channel control right request information to the first touch-screen terminal through the transmitting electrode of the second touch-screen terminal. After receiving the channel control right request information transmitted from the second touch-screen terminal through the receiving electrode of the first touch-screen terminal, the first touch-screen terminal transmits through its transmitting electrode the channel information that is used, and then the second touch-screen terminal receives through its receiving electrode the channel information transmitted from the first touch-screen terminal. The two touch-screen terminals can then communicate through the agreed channel.

Further, to ensure synchronous transmitting and receiving of the information of both terminals, the first touch-screen terminal needs to transmit through its transmitting electrode a synchronization signal to the second touch-screen terminal prior to communication, and the second touch-screen terminal receives information according to the synchronization signal.

Figure 4:
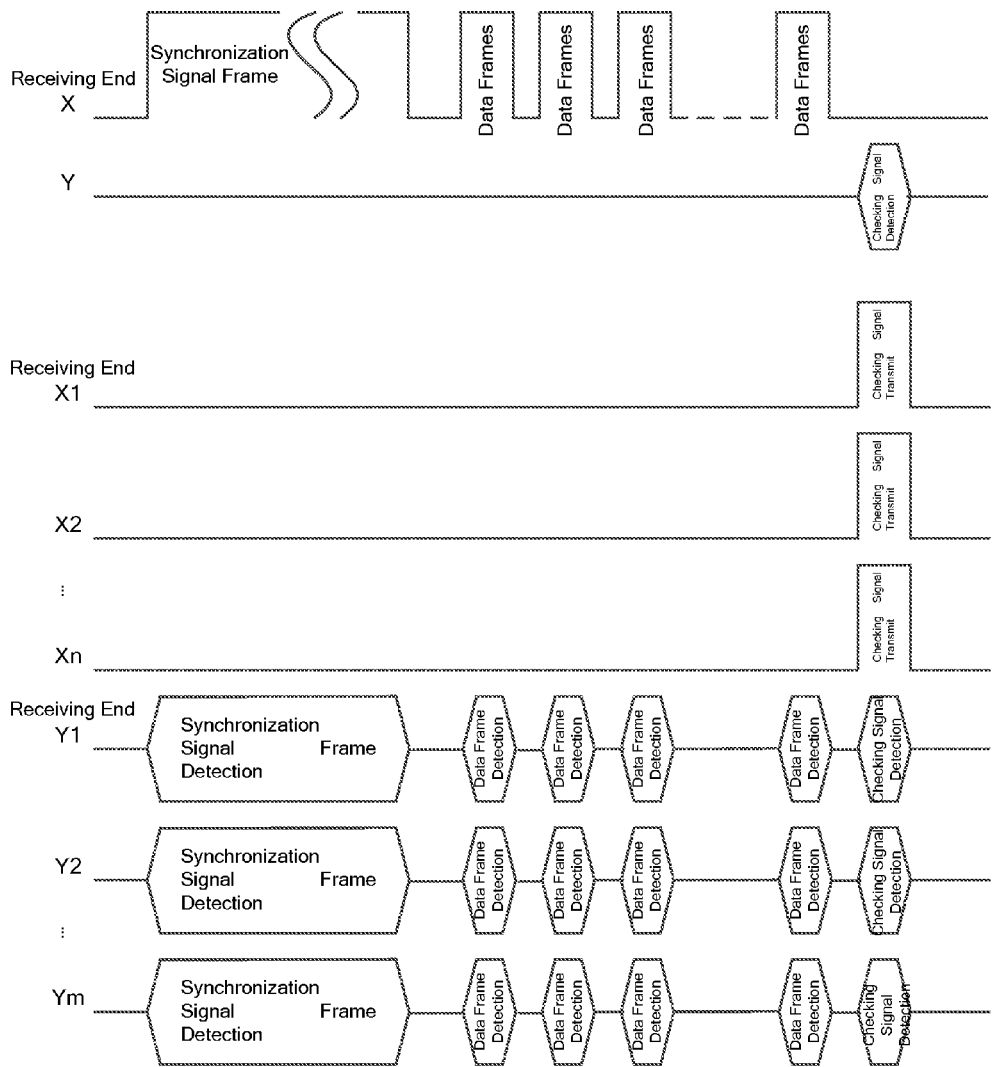
FIG. 4 illustrates the complete sequence of NFC communication between the touch-screen terminals according to one embodiment of the present invention.

FIG. 4 illustrates the complete sequence of NFC communication between the touch-screen terminals according to one embodiment of the present invention. After the communication connection is established, the two terminals are first synchronized and are checked after each frame or more frames data transmission.

Figure 6:
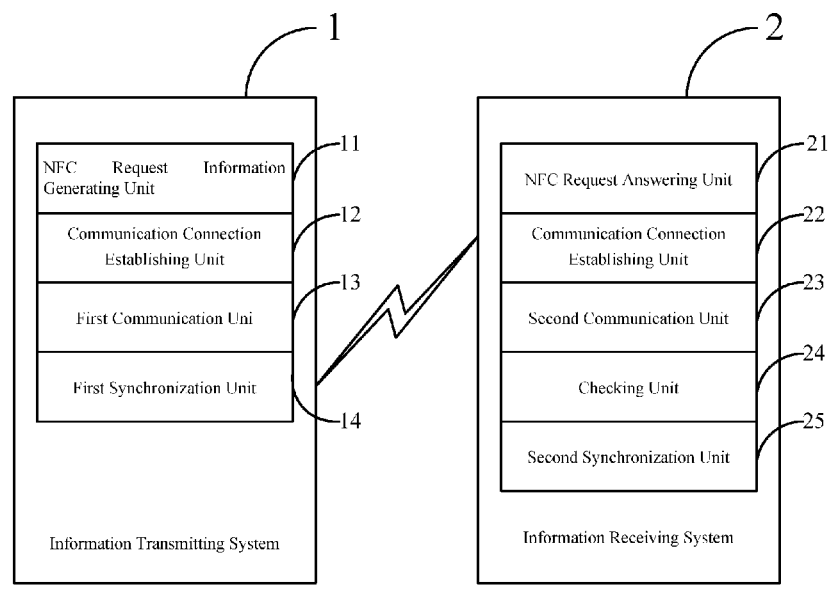
FIG. 6 illustrates a logic structure of a system for near-field communication between the first touch-screen terminal and the second touch-screen terminal according to one embodiment of the present invention.

FIG. 6 illustrates a logic structure of a system for NFC between touch-screen terminals. For ease of description, only the part of the system that relates to the present invention is shown.

Referring to FIG. 6, an information transmitting system 1 and an information receiving system 2 are embedded in the first touch-screen terminal and the second touch-screen terminal, respectively. As described above, the two touch-screen terminals each include the touch sensor. The touch sensor includes multiple transmitting electrodes and receiving electrodes disposed on the substrate to form capacitor structures. The transmitting electrodes and receiving electrodes transmit and receive signals, respectively.

The information transmitting system 1 at least includes an NFC request information generating unit 11, a communication connection establishing unit 12, and a first communication unit 13. The NFC request information generating unit 11 generates the NFC request information and transmits the NFC request information to the second touch-screen terminal through the transmitting electrode of the first touch-screen terminal. The communication connection establishing unit 12 establishes a communication connection with the second touch-screen terminal after the receiving electrode of the first touch-screen terminal receives the answer information from the second touch-screen terminal. After the communication connection is established, the first communication unit 13 transmits the communication information to the second touch-screen terminal through the transmitting electrode of the first touch-screen terminal.

The information receiving system 2 at least includes an NFC request answering unit 21, a communication connection establishing unit 22, and a second communication unit 23. Upon the receiving electrode of the second touch-screen terminal receiving the NFC request information from the first touch-screen terminal, the NFC request answering unit 21 answers the request and transmits the answer information to the first touch-screen terminal through the transmitting electrode of the second touch-screen terminal. The communication connection establishing unit 22 establishes a communication connection with the first touch-screen terminal after the transmitting electrode of the second touch-screen terminal transmits the answer information to the first touch-screen terminal. Finally, the second communication unit 23 receives the communication information from the first touch-screen terminal through the receiving electrode of the second touch-screen terminal.

Further, the data frames of the communication information include data bits and checking bits and, therefore, the information receiving system 2 further includes a checking unit 24 for performing checking calculation to the data bits and comparing the checking result against the checking bits to determine consistency after the receiving electrode of the second touch-screen terminal receives the communication information. If the checking result and the checking bits are inconsistent, the transmitting electrode of the second touch-screen terminal transmits a re-transmit request to the first touch-screen terminal.

Further, the information transmitting system 1 includes a first synchronization unit 14 for generating a synchronization signal, transmitting the synchronization signal to the second touch-screen terminal through the transmitting electrode of the first touch-screen terminal, and controlling the first communication unit 13 and the second touch-screen terminal to keep synchronous. Correspondingly, the information receiving system 2 further includes a second synchronization unit 25 for controlling the second communication unit 23 and the first touch-screen terminal to keep synchronous according to the synchronization signal received by the receiving electrode of the second touch-screen terminal.

It should be understood that, in practice, one touch-screen terminal is often embedded with both of the information generating system 1 and the information receiving system 2. In use, function (i.e. as a transmitting end or a receiving end) of the information transmitting system 1 and the information receiving system 2 can often interchange. However, when it comes to each specific communication step, the working principle of the first touch-screen terminal and the second touch-screen terminal is the same as described above.

Figure 7:
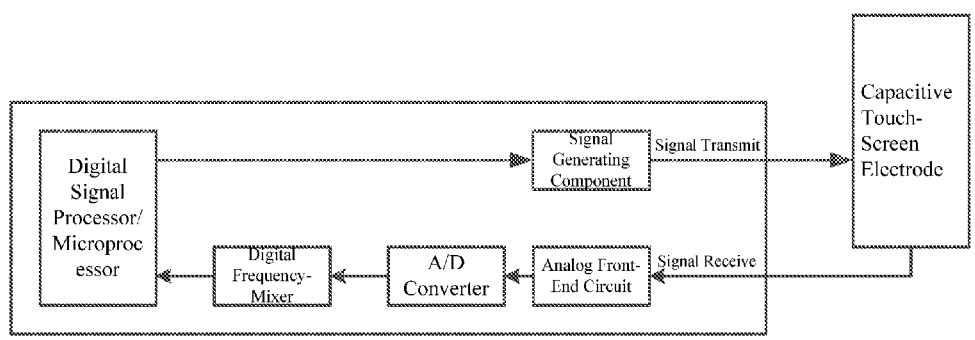
FIG. 7 illustrates one type of hardware structure of the touch-screen terminal according to one embodiment of the present invention.
Figure 8:
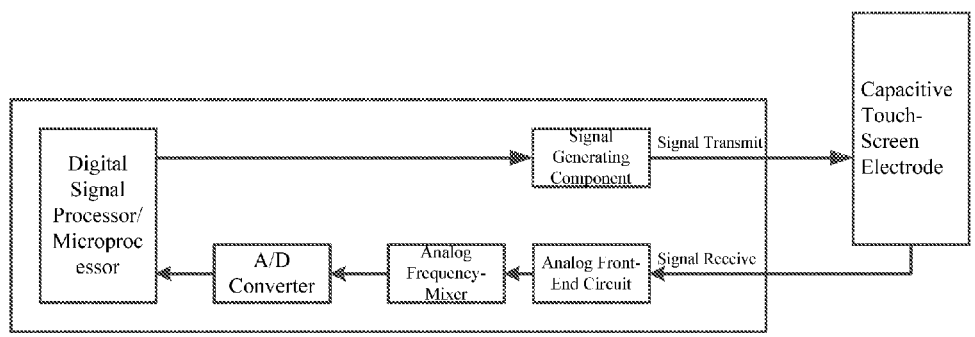
FIG. 8 illustrates another type of hardware structure of the touch-screen terminal according to one embodiment of the present invention.

FIG. 7 and FIG. 8 illustrate two exemplary types of hardware structures of the touch-screen terminal. In the hardware structure of FIG. 7, the signal is converted into a digital signal and then frequency-mixed. However, in the hardware structure of FIG. 8, the signal is first frequency-mixed and then converted into a digital signal. The hardware structure includes a signal generating component which, from the point of function, includes the NFC request information generating unit 11, the first synchronization unit 15, and the checking unit 24, and the remaining units can be software units embedded in a digital signal processor/microprocessor.

Figure 9:
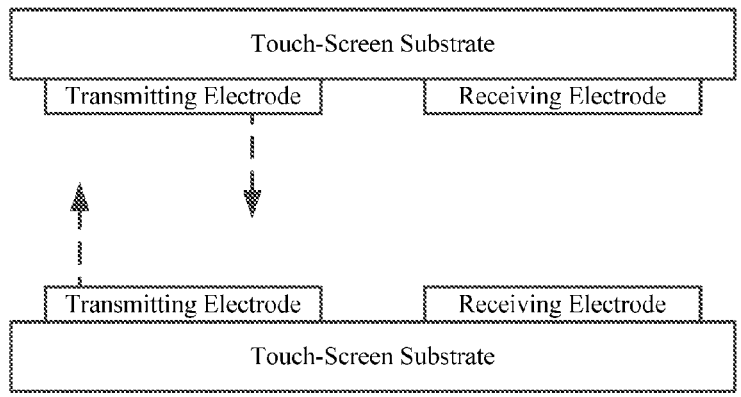
FIG. 9 illustrates conflict between information receiving and transmitting according to one embodiment of the present invention.
Figure 10:
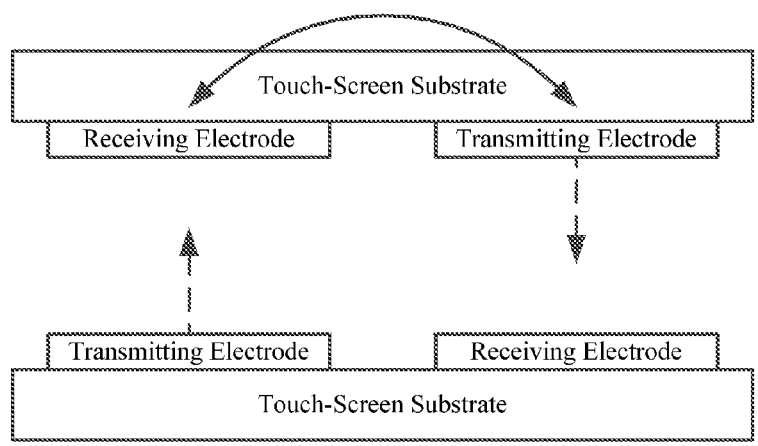
FIG. 10 illustrates automatic interchange of the functions of the transmitting electrode and the receiving electrode according to one embodiment of the present invention.
Figure 11:
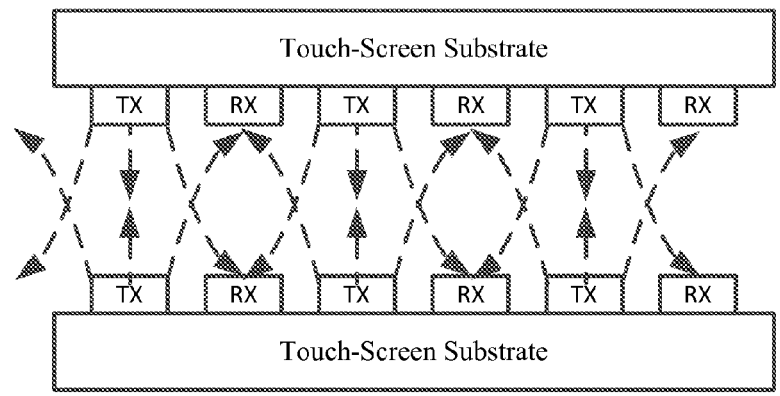
FIG. 11 illustrates an alternating arrangement of the transmitting electrodes and the receiving electrodes according to one embodiment of the present invention.

Further, considering that in use conflicts may occur between transmitting and receiving of the communication information, for example, as shown in FIG. 9, the transmitting electrode of one touch-screen substrate transmits the communication information to the transmitting electrode of the other touch-screen substrate, the present invention can avoid this issue in two manners. In one manner, as shown in FIG. 10, when a conflict occurs, the functions of the transmitting electrode and the receiving electrode are automatically interchanged. In the other manner, as shown in FIG. 11, the transmitting electrodes TX and the receiving electrodes RX are alternatingly disposed; when a conflict occurs, the transmitting electrode TX may transmit the communication information to one adjacent receiving electrode.

In the present invention, signal transmitting and receiving are achieved by multiplexing the electrodes of the touch-screen terminals, thereby enabling electric-field-based NFC. The communication rate can be higher than 500 Kbit/s. The system part for signal processing is embedded in the chip and, therefore, there is no need for the additional inductive card reader or part with the similar function. Therefore, the present invention does not change the original size of the touch-screen terminal. In addition, this chip can be fabricated on the same silicon wafer together with the touch-screen terminal's own driver chip, or even can multiplex part or all of the components of the touch-screen terminal's own driver chip.

It will be apparent to those skilled in the art that various modifications and variations can be made to the disclosed structure without departing from the scope or spirit of the invention. In view of the foregoing, it is intended that the present invention cover modifications and variations of this invention provided they fall within the scope of the following claims and their equivalents.

The invention claimed is:

1. A method for transmitting information in a near-field communication by a first touch-screen terminal, the first touch-screen terminal comprising a touch sensor, the touch sensor comprising multiple transmitting electrodes and receiving electrodes disposed on a substrate to form capacitor structures, the method comprising:
   the first touch-screen terminal transmitting near-field communication request information to the second touch-screen terminal through the transmitting electrode of the first touch-screen terminal;
   the first touch-screen terminal receiving answer information from the second touch-screen terminal through the receiving electrode of the first touch-screen terminal, and establishing a communication connection with the second touch-screen terminal;
   the first touch-screen terminal transmitting channel information that is used to the second touch-screen terminal through the transmitting electrode of the first touch-screen terminal after the first touch-screen terminal receives channel control right request information from the second touch-screen terminal through the receiving electrode of the first touch-screen terminal; and
   the first touch-screen terminal transmitting communication information to the second touch-screen terminal through the transmitting electrode of the first touch-screen terminal.

2. The method according to claim 1, wherein the method further comprises, after transmitting the communication information to the second touch-screen terminal through the transmitting electrode of the first touch-screen terminal:
   the first touch-screen terminal re-transmitting the communication information to the second touch-screen terminal after the first touch-screen terminal receives a re-transmitting request from the second touch-screen terminal through the receiving electrode of the first touch-screen terminal.

3. The method according to claim 1, wherein the method further comprises, prior to transmitting the communication information to the second touch-screen terminal through the transmitting electrode of the first touch-screen terminal:
   the first touch-screen terminal transmitting a synchronization signal to the second touch-screen terminal through the transmitting electrode of the first touch-screen terminal.

4. The method according to claim 1, wherein the near-field communication request information carries ID information of the first touch-screen terminal, and the answer information carries ID information of the second touch-screen terminal.

5. A system for transmitting information in a near-field communication by a first touch-screen terminal, the first touch-screen terminal comprising a touch sensor, the touch sensor comprising multiple transmitting electrodes and receiving electrodes disposed on a substrate to form capacitor structures, the transmitting electrodes and the receiving electrodes being configured to transmit and receive signals, respectively, the system comprising:
   a near-field communication request information generating unit configured to generate near-field communication request information and transmit the near-field communication request information to a second touch-screen terminal through the transmitting electrode of the first touch-screen terminal;
   a communication connection establishing unit configured to establish a communication connection with the second touch-screen terminal after the receiving electrode receives answer information from the second touch-screen terminal; and
   a first communication unit configured to transmit communication information to the second touch-screen terminal through the transmitting electrode of the first touch-screen terminal;
   wherein, the first touch-screen terminal is further configured for transmitting channel information that is used to the second touch-screen terminal through the transmitting electrode of the first touch-screen terminal after receiving channel control right request information from the second touch-screen terminal through the receiving electrode of the first touch-screen terminal and prior to transmitting the near-field communication request information to the second touch-screen terminal through the transmitting electrode of the first touch-screen terminal.

6. The system according to claim 5, wherein the first communication unit is further configured to re-transmit the communication information to the second touch-screen terminal through the transmitting electrode of the first touch-screen terminal after the first touch-screen terminal receives a re-transmitting request from the second touch-screen terminal.

7. The system according to claim 5, wherein the system further comprises a first synchronization unit configured to generate a synchronization signal, transmit the synchronization signal to the second touch-screen terminal through the transmitting electrode of the first touch-screen terminal, and control the first communication unit and the second touch-screen terminal to keep synchronous.

8. The system according to claim 5, wherein the transmitting electrodes and the receiving electrodes are either alternatingly arranged or the functions of the transmitting electrodes and the receiving electrodes are interchangeable.

9. A method for receiving information in a near-field communication by a second touch-screen terminal, the second touch-screen terminal comprising a touch sensor, the touch sensor comprising multiple transmitting electrodes and receiving electrodes disposed on a substrate to form capacitor structures, the transmitting electrodes and the receiving electrodes being configured to transmit and receive signals, respectively, the method comprising:

the second touch-screen terminal receiving near-field communication request information from a first touch-screen terminal through the receiving electrode of the second touch-screen terminal and answering the request information;

the second touch-screen terminal establishing a communication connection with the first touch-screen terminal after transmitting answer information to the first touch-screen terminal through the transmitting electrode of the second touch-screen terminal;

the second touch-screen terminal transmitting channel control right request information to the first touch-screen terminal through the transmitting electrode of the second touch-screen terminal, and receiving channel information from the first touch-screen terminal through the receiving electrode of the second touch-screen terminal; and the second touch-screen terminal receiving communication information from the first touch-screen terminal through the receiving electrode of the second touch-screen terminal.

10. The method according to claim 9, wherein data frames of the communication information comprise data bits and checking bits, and the method further comprises, after receiving the communication information from the first touch-screen terminal through the receiving electrode of the second touch-screen terminal:

the second touch-screen terminal performing checking calculation to the data bits and comparing checking result against the checking bits to determine consistency; wherein if the checking result and the checking bits are inconsistent, the second touch-screen terminal transmits through its transmitting electrode a re-transmit request to the first touch-screen terminal.

11. The method according to claim 9, wherein the method further comprises, prior to receiving the communication information from the first touch-screen terminal through the receiving electrode of the second touch-screen terminal:

the second touch-screen terminal receiving a synchronization signal from the first touch-screen terminal through the receiving electrode of the second touch-screen terminal.

12. The method according to claim 9, wherein the near-field communication request information carries ID information of the first touch-screen terminal, and the answer information carries ID information of the second touch-screen terminal.

13. A system for receiving information in a near-field communication by a second touch-screen terminal, the second touch-screen terminal comprising a touch sensor, the touch sensor comprising multiple transmitting electrodes and receiving electrodes disposed on a substrate to form capacitor structures, the transmitting electrodes and the receiving electrodes being configured to transmit and receive signals, respectively, the system comprising:

a near-field communication request answering unit configured to answer a near-field communication request after the receiving electrode of the second touch-screen terminal receives near-field communication request information from a first touch-screen terminal, and transmit answer information to the first touch-screen terminal through the transmitting electrode of the second touch-screen terminal;

a communication connection establishing unit configured to establish a communication connection with the first touch-screen terminal after the near-field communication request answering unit transmits the answer information to the first touch-screen terminal; and a second communication unit configured to receiving communication information from the first touch-screen terminal through the receiving electrode of the second touch-screen terminal;

wherein, the second touch-screen terminal is further configured for transmitting channel control right request information to the first touch-screen terminal through the transmitting electrode of the second touch-screen terminal and receiving channel information from the first touch-screen terminal through the receiving electrode of the second touch-screen terminal, prior to receiving communication information from the first touch-screen terminal through the receiving electrode of the second touch-screen terminal.

14. The system according to claim 13, wherein data frames of the communication information comprise data bits and checking bits, and the system further comprises:

a checking unit configured to perform checking calculation to the data bits and comparing checking result against the checking bits to determine consistency after the second touch-screen terminal receives the communication information; wherein if the checking result and the checking bits are inconsistent, the second touch-screen terminal transmits through its transmitting electrode a re-transmit request to the first touch-screen terminal.

15. The system according to claim 13, wherein the system further comprises a second synchronization unit configured to control the second communication unit and the first touch-screen terminal to keep synchronous according to a synchronization signal received by the receiving electrode of the second touch-screen terminal.

16. The system according to claim 13, wherein the transmitting electrodes and the receiving electrodes are either alternatingly arranged or the functions of the transmitting electrodes and the receiving electrodes are interchangeable.

17. A method for near-field communication between a first touch-screen terminal and a second touch-screen terminal, the first and second touch-screen terminals each comprising a touch sensor, the touch sensor comprising multiple transmitting electrodes and receiving electrodes disposed on a substrate to form capacitor structures, the transmitting electrodes and the receiving electrodes being configured to transmit and receive signals, respectively, the method comprising:

the first touch-screen terminal transmitting near-field communication request information to the second touch-screen terminal through the transmitting electrode of the first touch-screen terminal;

the second touch-screen terminal receiving the near-field communication request information from the first touch-screen terminal through the receiving electrode of the second touch-screen terminal and answering the request information;

the first touch-screen terminal establishing a communication connection with the second touch-screen terminal after the first touch-screen terminal receives answer information from the second touch-screen terminal through the receiving electrode of the first touch-screen terminal;

the first touch-screen terminal transmitting channel information that is used to the second touch-screen terminal through the transmitting electrode of the first touch-screen terminal after the first touch-screen terminal receives channel control right request information from the second touch-screen terminal through the receiving electrode of the first touch-screen terminal, and the second touch-screen terminal transmitting channel control right request information to the first touch-screen terminal through the transmitting electrode of the second touch-screen terminal and receiving channel information from the first touch-screen terminal through the receiving electrode of the second touch-screen terminal; and the first touch-screen terminal and the second touch-screen terminal communicating therebetween.

* * * * *